United States Patent
Cullen et al.

(10) Patent No.: US 6,238,729 B1
(45) Date of Patent: May 29, 2001

(54) OPTICAL TRANSMISSION SYSTEMS AND APPARATUSES INCLUDING BRAGG GRATINGS AND METHODS OF MAKING

(75) Inventors: Thomas J. Cullen, Columbia; Timothy E. Hammon, Silver Spring; John M. Stockhausen, Arnold, all of MD (US)

(73) Assignee: Acme Grating Ventures, LLC, Columbia, MD (US)

( * ) Notice: Subject to any disclaimer, the term of this patent is extended or adjusted under 35 U.S.C. 154(b) by 0 days.

(21) Appl. No.: 09/544,485

(22) Filed: Apr. 7, 2000

Related U.S. Application Data

(63) Continuation of application No. 09/276,015, filed on Mar. 25, 1999.

(51) Int. Cl.[7] .............................. B05D 5/06; G02B 6/02; G02B 6/10
(52) U.S. Cl. ...................... 427/8; 427/163.2; 427/385; 427/124; 427/141
(58) Field of Search .......................... 427/163.2, 8, 164, 427/166; 385/124, 141, 144, 145

(56) References Cited

U.S. PATENT DOCUMENTS

| | | |
|---|---|---|
| 4,343,890 | 8/1982 | Phillips et al. . |
| 4,695,122 | * 9/1987 | Ishida et al. .......................... 385/130 |

(List continued on next page.)

FOREIGN PATENT DOCUMENTS

| | | |
|---|---|---|
| 0 813 080 | 12/1997 | (EP) . |
| 7-244210 | 9/1995 | (JP) . |
| 8-286054 | 11/1996 | (JP) . |
| WO 96/36895 | 11/1996 | (WO) . |
| WO 97/21120 | 6/1997 | (WO) . |

OTHER PUBLICATIONS

Morey et al., "Photoinduced Bragg Gratings in Optical Fibers", Optics & Photonics News/Feb. 1994, pp. 8–14.

Ouelletee et al., "Enhancement of second-harmonic generation in optical fibers by a hydrogen and heat Treatment", Appl. Phys. Lett., vol. 54, No. 12, (Mar. 12, 1989), pp. 1086–1088.

Derwent—Acc No—1997–025145—abstract to JP 08286017A—Nov. 1996 to Sumitomo Electric Ind. Co.

Derwent—Acc No—1997–56167—abstract to FR 2738353A1—Mar. 1997—by Bayin et al. (France Telecom).

(JPAB) Japanese Abstract of JP408286012A to Ito et al., Nov. 1996.

Derwent—Acc No: 1999–153630—abstract to Burke et al. (Feb. 1999) with AU988501A—published Feb. 22, 1999—WO990633A1 published Feb. 11, 1999.

Patent Abstracts of Japan, vol. 1997 No. 3, Mar. 31, 1997 & JP 08 286054 A (Sumitomo Electric Ind Ltd), Nov. 1, 1996 abstract.

*Primary Examiner*—Marianne Padgett

(57) ABSTRACT

Apparatuses, systems, and methods are disclosed for providing optical communications. Bragg grating used in the optical components and systems of the present invention are produced by selectively hydrogenating one or more selected sections of an optical waveguide in general, and particularly optical fiber. Selective hydrogenation can be performed by selectively establishing local conditions in a first environment conducive to introducing greater quantities of hydrogen into selected sections than into non-selected sections, which are maintained in a second environment. The extent of selective hydrogenation and the hydrogen concentration difference between selected and non-selected section of the waveguide is a function of the temperature, pressure, and time of exposure established in the first and second environments.

23 Claims, 2 Drawing Sheets

U.S. PATENT DOCUMENTS

| | | |
|---|---|---|
| 4,725,110 | 2/1988 | Glenn et al. . |
| 4,807,950 | 2/1989 | Glenn et al. . |
| 4,948,407 * | 8/1990 | Bindell et al. ........................ 385/141 |
| 5,007,705 | 4/1991 | Morey et al. . |
| 5,077,816 | 12/1991 | Glomb et al. . |
| 5,193,136 * | 3/1993 | Chang et al. ........................ 385/130 |
| 5,235,659 | 8/1993 | Atkins et al. . |
| 5,287,427 | 2/1994 | Atkins et al. . |
| 5,320,904 | 6/1994 | Mitchell . |
| 5,327,515 | 7/1994 | Anderson et al. . |
| 5,351,321 | 9/1994 | Snitzer et al. . |
| 5,351,332 * | 9/1994 | Cook ........................ 385/116 |
| 5,367,588 | 11/1994 | Hill et al. . |
| 5,393,561 | 2/1995 | Bierlein et al. . |
| 5,416,863 | 5/1995 | Vengsarkar . |
| 5,478,371 | 12/1995 | Lemaire et al. . |
| 5,500,031 | 3/1996 | Atkins et al. . |
| 5,620,496 | 4/1997 | Erdogan et al. . |
| 5,745,617 | 4/1998 | Starodubov et al. . |
| 5,896,484 | 4/1999 | Borrelli et al. . |
| 5,966,233 | 11/1999 | Fujiwara et al. . |
| 5,979,188 | 11/1999 | Ojha . |
| 6,115,524 * | 9/2000 | Burke et al. ........................ 385/141 |

* cited by examiner

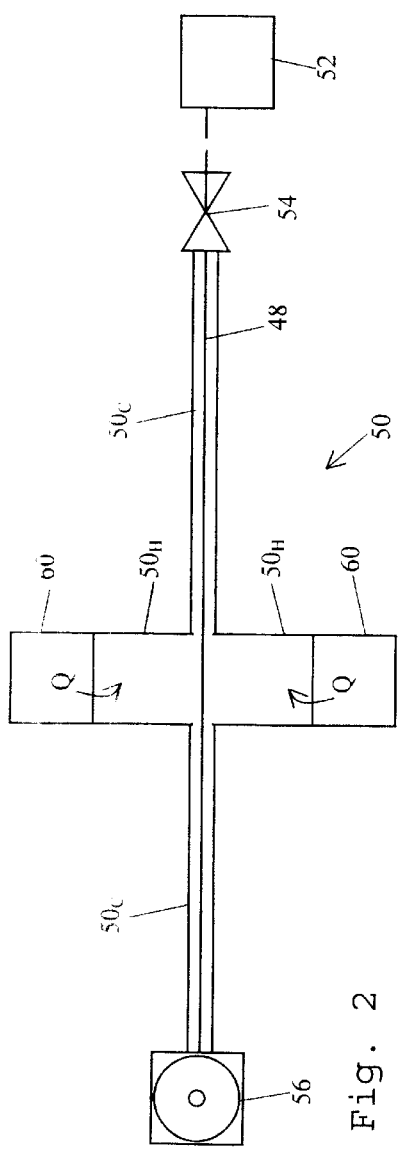
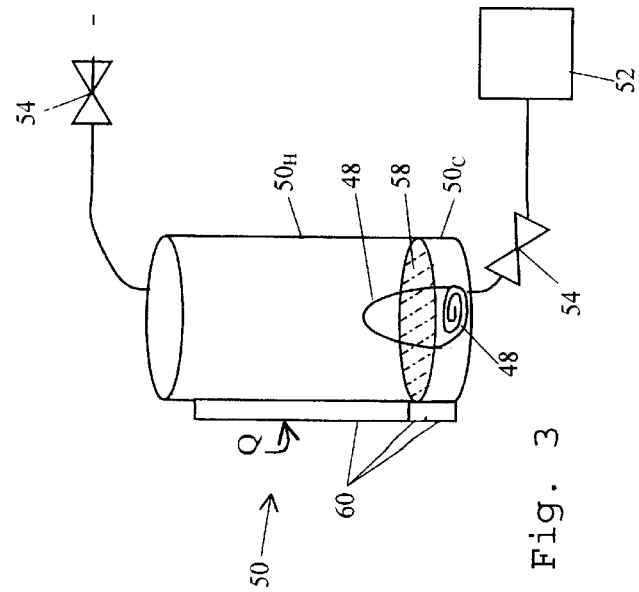

OPTICAL TRANSMISSION SYSTEMS AND APPARATUSES INCLUDING BRAGG GRATINGS AND METHODS OF MAKING

CROSS-REFERENCE TO RELATED APPLICATIONS

This application is a continuation application of U.S. patent application Ser. No. 09/276,015 filed Mar. 25, 1999, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to communication networks and systems. More particularly, the invention relates to optical WDM systems and optical components employing Bragg gratings, and methods of making Bragg gratings for use therein.

Optical communication systems transmit information by generating and sending optical signals corresponding to the information through optical transmission fiber. Information transported by the optical systems can include audio, video, data, or any other information format. The optical systems can be used in telephone, cable television, LAN, WAN, and MAN systems, as well as other communication systems.

Information can be optically transmitted using a broad range of frequencies/wavelengths, each of which is suitable for high speed data transmission and is generally unaffected by conditions external to the fiber, such as electrical interference. Also, information can be carried using multiple optical wavelengths that are combined using wavelength division multiplexing ("WDM") techniques into one optical signal and transmitted through the optical systems. As such, optical fiber transmission systems can provide significantly higher transmission capacities at substantially lower costs than electrical transmission systems.

One difficulty that exists with WDM systems is that the various signal wavelengths often have to be separated for routing/switching during transmission and/or reception at the signal destination. In early WDM systems, the wavelength spacing was limited, in part, by the ability to effectively separate wavelengths from the WDM signal at the receiver. Most optical filters in early WDM systems employed a wide pass band filter, which effectively set the minimum spacing of the wavelengths in the WDM system.

Diffraction gratings were proposed for use in many transmission devices; however, the use of separate optical components in free space configurations were cumbersome and posed serious problems in application. Likewise, etched optical fiber gratings, while an improvement over diffraction gratings, proved difficult to effectively implement in operating systems.

The development of holographically induced fiber Bragg gratings has facilitated the cost effective use of grating technology in operating optical transmission systems. In-fiber Bragg gratings have provided an inexpensive and reliable means to separate closely spaced wavelengths. The use of in-fiber Bragg grating has further improved the viability of WDM systems by enabling direct detection of the individually separated wavelengths. For example, see U.S. Pat. No. 5,077,816 issued to Glomb et al.

Holograpically written optical fiber Bragg gratings are well known in the art. See, for instance, U.S. Pat. Nos. 4,725,110 and 4,807,950, which are incorporated herein by reference. Holographic gratings are generally produced exposing an optical waveguide, such a silica-based optical fiber or planar waveguide, to an interference pattern produced by intersecting radiation beams, typically in the ultraviolet frequency range. The intersecting beams can be produced interferometrically using one or more radiation sources or using a phase mask. For examples, see the above references, as well as U.S. Pat. Nos. 5,327,515, 5,351,321, 5,367,588 and 5,745,617, and PCT Publication No. WO 96/36895 and WO 97/21120, which are incorporated herein by reference.

Bragg gratings provide a versatile means of separating wavelengths, because the wavelength range, or bandwidth, over which the grating is reflective as well as the reflectivity, can be controlled. Initially, however, only relatively narrow bandwidth, low reflectivity Bragg gratings could be produced using holographic methods.

It was soon found that the sensitivity of the waveguide to ultraviolet radiation and the resulting bandwidth and reflectivity could be greatly enhanced by exposing the waveguide to hydrogen and its isotopes before writing the grating. Hydrogenation of the fiber was originally performed as a high temperature annealing process. For example, see, F. Ouellette et al., Applied Physics Letters, Vol. 58(17), p. 1813, (4 hours at 400° C. in 12 atm. of $H_2$) or G. Meltz et al., SPIE International Workshop on Photoinduced Self-Organization in Optical Fiber, May 10–11, 1991, Quebec City, Canada, paper 1516–18 (75 hours at 610° C. in 1 atm. $H_2$). It was later found that the hydrogenation could be performed at lower temperatures $\leq 250°$ C. with $H_2$ pressures $\geq 1$ atm., if a sufficient length of time is permitted for hydrogen to get into the fiber. See U.S. Pat. No. 5,235,659 and its progeny.

While low temperature hydrogenation takes longer to perform, presumably due, at least in part, to slower hydrogen diffusion rates, it provides benefits that typically offset the time penalty. For example, the low temperature hydrogenation generally does not damage polymer coatings that are typically used to protect the optical fiber cladding and core. Also, there are fewer safety issues with handling hydrogen at lower temperatures and pressures.

Although low temperature hydrogenation is effective for introducing hydrogen into the fiber, the gratings written into the fiber must still be annealed at higher temperatures to stabilize the reflectivity of the grating. See U.S. Pat. Nos. 5,235,659 and 5,620,496. One technique that may increase grating stability written in low temperature hydrogenated fiber is described in OFC'99 PostDeadline Paper PD20 (1999) ("PD20"). In PD20, low temperature hydrogenated fiber was exposed to a uniform UV beam prior to writing grating to vary the fiber structure. In addition, the fiber was low temperature annealed at 125° C. for 24 hours before writing the grating to drive off at least some of the hydrogen from the fiber. The high reflectivity gratings that were written in the low temperature annealed fiber did not vary significantly, when exposed to a subsequent low temperature anneal at 125° C.

A shortcoming of writing Bragg gratings in hydrogen loaded fiber is that the fiber is more difficult to splice. Therefore, splicing efficiencies are decreased and increased processes must be put into place to ensure proper handling of the fiber. High temperature annealing of the fiber to remove hydrogen is limited to only portions of the fiber in which the coating has been removed to write the grating. In techniques that do not require the coating to be removed, annealing of the grating is also limited to temperatures that do not damage the coatings.

The prominent role assumed by holographically induced Bragg gratings in fiber and other waveguide optical components and systems requires that improved techniques for the production of Bragg gratings be continually developed. Likewise, the improvements in Bragg grating technology will further provide for the continued development of increasingly flexible, higher capacity, and lower cost optical systems.

BRIEF SUMMARY OF THE INVENTION

The apparatuses and methods of the present invention address the above need for improved Bragg grating production techniques and optical components and systems that include the Bragg gratings. Optical components and transmission system of the present invention includes at least one Bragg grating prepared in accordance with the present invention. In various embodiments, Bragg grating of the present invention are provided to stabilize optical signal and/or pump sources, perform selective filtering in transmission and/or receiving, and other grating based applications as may be known in the art.

Methods of the present invention include selectively hydrogenating one or more selected sections of an optical waveguide in general, and particularly optical fiber. Selective hydrogenation can be performed by selectively establishing local conditions in a first environment conducive to introducing greater quantities of hydrogen into selected sections than into non-selected sections, which are maintained in a second environment. The extent of selective hydrogenation and the hydrogen concentration difference between selected and non-selected section of the waveguide is a function of the temperature, pressure, and time of exposure established in the first and second environments.

In various embodiments of the present invention, the local temperature in the first environment is elevated to increase the rate of hydrogen ingress into the selected section of the waveguide. Increased ingress rates can be achieved by maintaining the local concentration of hydrogen in the first environment, while applying locally elevated temperatures. The local concentration in the first environment can be maintained at elevated temperatures by configuring a hydrogenation device to include a substantial portion of its volume within the first environment. Alternatively, a compartmentalized hydrogenation device can be used to vary the environmental conditions in the first and second environments within the device. Compartmentalized devices can provide for varying the pressure, hydrogen concentration and/or exposure time in the first and second environments.

The difference between the local concentration and temperature along the sections of fiber and the length of exposure generally determines the relative extent of hydrogenation. In various embodiments, the hydrogenation device can be configured such that the heated volume of the first environment proximate to the selected section represents greater than 90% of the total device volume. Increasing the heated volume percentage and/or the local temperature will increase the difference in hydrogenation between the selected section and the remainder of the fiber.

Selective hydrogenation can be performed over a wide temperature range. The methods are not limited to low temperatures to prevent damage to the fiber coating, because high temperature selective hydrogenation can be limited to only those sections in which the coating will be removed to write the grating.

It is desirable to perform selective hydrogenation at temperatures in excess of 250° C., because the exposure time can be decreased by several orders of magnitude compared to low temperatures. In addition, high pressures, e.g. >200 atm., can be employed to further decrease the exposure time by increasing hydrogen concentration in the device. As such, higher throughput can be achieved and hydrogenation devices do not have to remain charged with hydrogen for extended periods of time.

An additional benefit of high temperature selective hydrogenation is that many coatings are easier to remove following exposure to elevated temperatures. The removal of the coating to-write the grating also facilitates high temperature annealing to increase the long term stability of the grating characteristics.

In addition, the second environment can be controlled to produce varying levels of hydrogenation in the non-selected sections of the waveguide. In fact, extremely low hydrogen concentrations can be achieved in the non-selected when high temperature selective hydrogenation is used, because of the short exposure times. Therefore, the non-selected sections of the fiber can be spliced more easily than traditional methods, which leads to further efficiency increases.

Accordingly, the present invention addresses the aforementioned needs for improved Bragg grating production methods to increase the efficiency and capacity of optical components and communication systems without commensurate increases in the cost of optical components. These advantages and others will become apparent from the following detailed description.

BRIEF DESCRIPTION OF THE DRAWINGS

Embodiments of the present invention will now be described, by way of example only, with reference to the accompanying Figures wherein like members bear like reference numerals and wherein:

FIGS. 2–3 depict exemplary hydrogenation devices of the present invention.

DETAILED DESCRIPTION OF THE INVENTION

Figure 1:
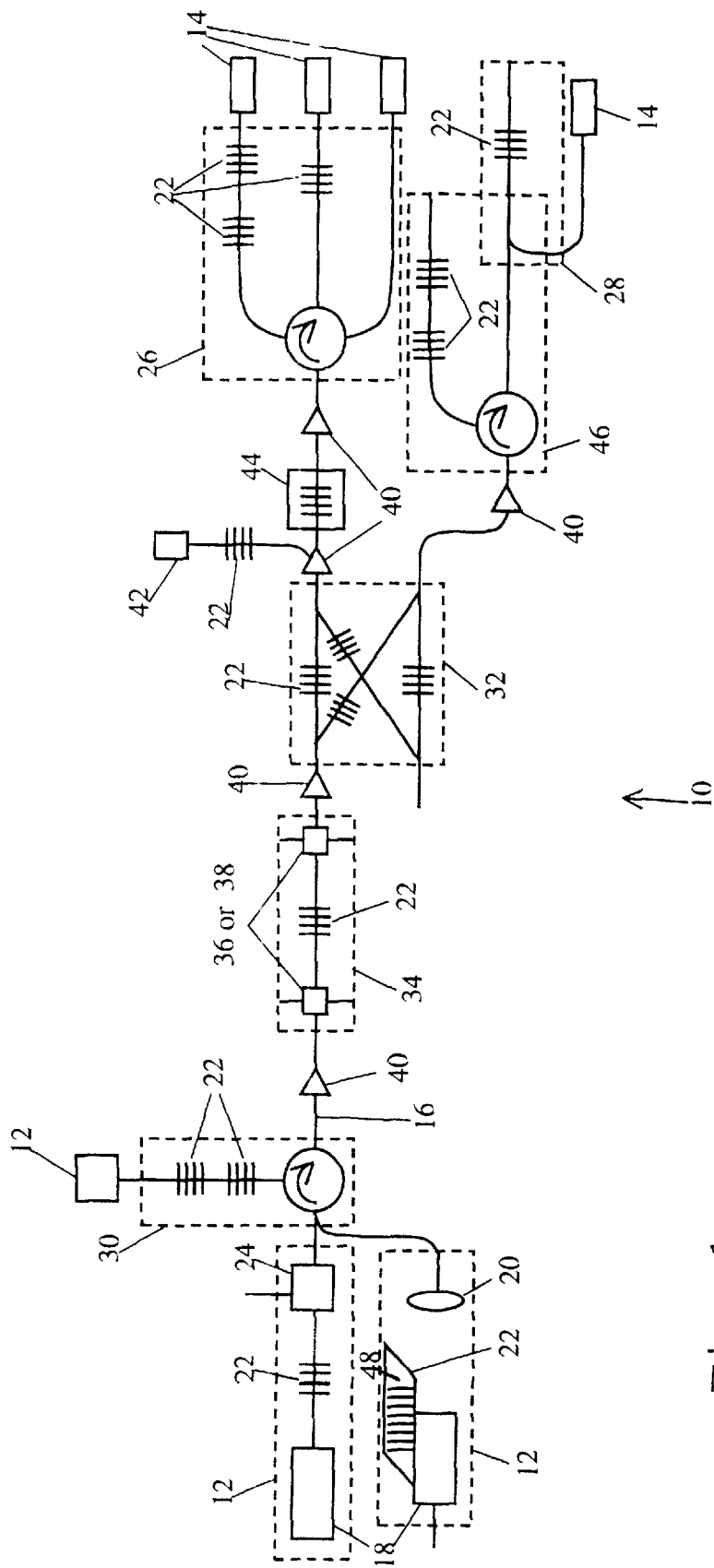
FIG. 1 depict optical components and systems of the present invention.

The operation of optical systems 10 of the present invention will be described generally with reference to the drawings for the purpose of illustrating embodiments only and not for purposes of limiting the same. As used herein, the term "information" should be broadly construed to include any type of audio signal, video signal, data, instructions, etc. that can be transmitted as optical signals. Also, the term "hydrogen" is meant to include atomic and diatomic hydrogen, H and $H_2$, respectively, as well as hydrogen isotopes, such as deuterium.

Generally, the optical system 10 includes at least one optical transmitter 12 in optical communication with at least one optical receiver 14 via an optical transmission waveguide 16, such as optical fiber, as shown in FIG. 1. Each transmitter 12 is configured to transmit information via one or more information carrying wavelengths $\lambda_{i,k}$ that be combined into a wavelength division multiplexed ("WDM") optical signal. The transmitter 12 may include one or more coherent or incoherent optical sources 18, such as semiconductor and fiber lasers, and associated electronic control circuitry and optics, i.e. lens 20, as is known in the art.

The wavelength emitted by the optical sources 18 can be stabilized or established using Bragg gratings 22 to form an internal and/or external laser cavity. For example, distributed feedback ("DFB") and Bragg reflector ("DBR") lasers, and other lasers can include Bragg gratings 22 in both the laser cavity and the external cavity. Likewise, Bragg grating 22 can be used to select wavelengths from broadband sources, such as light emitting diodes. The optical source 18 can be directly modulated with information to be transmitted, or an external modulator 24 can be used to modulate the information onto an optical carrier wavelength provided by the source 18. Alternatively, the external modulator 24 can be replaced with an optical upconverter to upconvert a modulated electrical carrier onto an optical wavelength different than the optical carrier wavelength emitted by the optical source 18.

The receiver 14 can include Bragg gratings 22 in demultiplexers 26 and/or filters 28 to separate one or more wavelengths from a wavelength division multiplexed ("WDM") optical signal. The receiver 14 can be configured to coherently or directly detect the selected wavelengths depending upon the system 10.

In addition, the transmitter 12, receivers 14, as well as other components, can be wavelength tuned to provide additional flexibility in the system 10. Wavelength tuning can be performed by varying the reflective wavelength of the Bragg gratings 22 using techniques such as those described in U.S. Pat. No. 5,007,705, and other techniques as is known in the art.

Similarly, the Bragg gratings 22 can be used in a multiplexers 30 for combining multiple optical signals and possibly to spectrally shape the optical signals. Bragg gratings 22 can also be employed in optical switches 32, including optical routers and cross-connects, to switch, add, or drop signal wavelengths between optical paths. The optical switches 32 can be further configured to serve as an add and/or drop device 34. Combiners 36 and distributors 38, such as couplers and circulators, deployed in various combinations in the add/drop device 34 to provide for wavelength reuse, as may be appropriate and is known in the art.

The system 10 may include one or more optical amplifiers, such as rare earth, i.e., erbium, or other doped fiber, Raman pumped fiber, or semiconductor, to optical regenerate optical signals in the waveguide 16. Bragg gratings 22 can be used to wavelength stabilize optical pump power provided by a pump laser 42, as well as to gain flatten the amplified signal wavelengths in gain flattening filters 44. Dispersion compensating devices or amplified spontaneous emission "ASE" filters 46 including Bragg gratings 22 can be used in the system 10.

Bragg gratings 22 of the present invention are produced by selectively hydrogenating one or more selected sections of a waveguide 48. The waveguide 48 can include various waveguide structures in which holographic gratings can be written, such as planar or fiber waveguides. The waveguides 48 in which the Bragg gratings 22 are holographically written can be the same or different geometry and/or composition as the transmission waveguides 16. Specific examples with respect to selectively hydrogenating optical fiber are provided to more fully explain the invention and not to limit the same.

FIGS. 2 and 3 provide exemplary embodiments of selective hydrogenation devices 50 of the present invention. The devices 50 are generally configured to facilitate the establishment of multiple environments within the device 50. For example, one or more hot zones $50_H$ and one or more cool zones $50_C$ can be provided within the device 50.

One of more waveguides 48 are inserted into the device 50 with first sections of the waveguide 48 to be selectively hydrogenated are within the hot zones $50_H$. Likewise, second sections that are to be hydrogenated to a lesser extent are positioned within the cool zones $50_C$. A first environment can be established to facilitate hydrogenation on the waveguide within the hot zone $50_H$, whereas, a second environment can be established to facilitate a different level of hydrogenation within the cool zone $50_C$.

In various embodiments of the present invention, the local temperature in the first environment is elevated to increase the rate of hydrogen ingress into the selected section of the waveguide. Increased ingress rates can be achieved by maintaining the local concentration of hydrogen in the first environment, while applying locally elevated temperatures: The local concentration in the first environment can be maintained at elevated temperatures by configuring a hydrogenation device to include a substantial portion of its volume within the first environment. The change in concentration within the first environment at elevated temperature is proportional to the percentage of the total volume within the first environment. Therefore, it is generally desirable to provide as much of the total volume in the first environment as possible. For example, if the volume in the first environment is ten times greater than volume in the second environment, the local concentration in the first environment at 300° C. will decrease less than ~10% relative to the second environment at ambient temperatures.

The amount of hydrogen available to hydrogenate the waveguide 48 is directly proportional to the hydrogen pressure introduced in the hydrogenation device 50. Therefore, increasing the hydrogen pressure in the device 50 can reduce the hydrogenation time. High pressure hydrogen devices 50 and corresponding sources 52 are available to allow hydrogen pressure exceeding 3000 psi to be introduced into and maintained in the devices 50. While high pressure hydrogen presents an increased safety concern, the time in which the device 50 must be maintained under pressure are substantially decreased.

It is noted that selective hydrogenation was performed using commercial hydrogen tanks as the source 52, which are typically charged at 3000 psi±gage error for delivery. Selective hydrogenation can be performed at higher or lower pressures depending upon available hydrogen sources 52 and the time available to perform the selective hydrogenation.

It will be appreciated that different environment can be established within the hot and cool zones to produce different hydrogenation levels, or hydrogen concentrations, within the waveguide 48 in each zone. Also, the cool zones $50_C$ can be actively heated or cooled depending upon the desirable levels of hydrogenation.

It may also be desirable to bring the sections of small dimensioned waveguides 48 into thermal contact with the walls of the device 50 in the cool zones $50_C$. Thermal contact will allow more precise and efficient temperature control of the waveguides 48 in the cool zone $50_C$. Alternatively, the device 50 can be configured such that one environment is established within the device and only that section of the waveguide 48 to be selectively hydrogenated is within the device 50.

The device 50 shown in FIG. 2 can be tubular in design with a cross-sectional geometry appropriate for the waveguide(s) 48 to be selectively hydrogenated. The cross-sectional shape of the device 50 also depends on the system pressure at which the hydrogenation will be performed. A circular cross-section for the device 50 is generally suitable for high pressure hydrogenation methods.

In the operation of the device 50, the waveguide 48 is placed into the device 50, such that sections to be selectively hydrogenated are placed within one of the hot zones $50_H$. The device 50 is sealed and the air within the device 50 is evacuated and/or purged with a gas that will not substantially affect the waveguide 48, such as nitrogen. Hydrogen can be used to purge the device 50, although it is generally desirable to use a less expensive purge gas. The hydrogen and purge gases are introduced from a gas source 52 through a valve 54 into the device and a second valve is provided to remove the gases. Conditions in the first and second environments are established for a requisite period of time to perform the selective hydrogenation. Following the selective hydrogenation the device is cooled, the system pressure and temperature are lowered to ambient, if necessary, and the waveguides 48 are removed from the device 50.

It will be appreciated that the hydrogen and purge gases can be recycled as may be appropriate. Recycling becomes a greater economic concern when expensive hydrogen isotopes, such as deuterium are used.

The embodiment shown in FIG. 2 can result in a substantial linear distance between the hot zones and the cool zones. Given the small volumes associated with the cool zone, additional temperature control over the cool zone may not be required, if ambient cool zone temperatures are acceptable. In fact, it may be possible to place additional lengths of fiber on a spool 56 to facilitate fiber loading into the device 50 without multiple exposures substantially affecting the additional fiber on the spool 56.

A thermal and/or pressure barrier 58 can be used to segregate the hot and cool zones and/or high and low pressure zones in the device 50, such as shown in FIG. 3. Fiber sections that are to be selectively hydrogenated are passed through the barrier 58 into the hot zone $50_H$, while the rest of the fiber 48 remains in the cool zone $50_C$.

The thermal barriers 48 can be fabricated using any appropriate insulating materials, such as alumina, zirconia and other suitable materials. When the barrier 48 is configured as a pressure boundary, selective hydrogenation can be performed by varying the pressure, hydrogen concentration, and exposure time, in addition to or in lieu of the temperature.

In the hot zone $50_H$, a heat exchanger 60 can be provided to introduce heat Q into the device 50. The temperature in the hot zone $50_H$ can be monitored using thermocouples and the heat exchanger 60 controlled to maintain a desired temperature as is known in the art. It may also be desirable to provide additional heat exchangers 60 to maintain a desired temperature in the cool zones $50_C$ of the device 50, as well as any zone interface regions.

The precise conditions at which the selective hydrogenation is performed depend upon the desired characteristics in the Bragg grating to be written into the waveguide 48, the production requirements, and the capabilities of the skilled artisan. A number of examples are provided to provide an appreciation of the value of the significant parameters.

Bragg gratings can be written using the various techniques set forth in the above references. The precise technique used to write the gratings 22 may depend upon the characteristics of the grating 22. The gratings 22 can be written using a stationary apparatus and laser with a beam size sufficiently large to write the entire grating at one time. Alternatively, scanning apparatuses can be employed to control the length, reflectivity, reflective wavelengths, and/ or other characteristics of the gratings. For example, the grating characteristics can be controlled by providing relative movement, either at a constant or varying rate, unidirectional or dithering, between the waveguide 48 and the interference pattern.

The Bragg grating 22 can be annealed to groom and stabilize the grating characteristics, such as bandwidth and reflectivity, and center reflective wavelength. Generally, the gratings 22 are annealed at a sufficiently high temperature, i.e., 300° C., to ensure stable grating characteristics. Annealing will generally reduce the bandwidth and reflectivity of the grating and vary the reflective wavelength. Therefore, it may be desirable to write the Bragg gratings such that the desired grating characteristics will be achieved upon annealing.

An embodiment of the device 50 was constructed using 316 stainless steel tubing and Swagelok™ fittings, as generally shown in FIG. 2, but without the fiber source/spool 56. Selectively hydrogenation of various fiber types, including Ge and Ge/B doped fibers, was performed with the cool zone $50_C$ exposed to ambient temperatures without additional control and the conditions shown in the table below. Bragg gratings 22 were written into the fiber using a scanning UV beam having a wavelength of 244 nm and phase mask using conventional techniques as previously described. Bragg gratings written in the unhydrogenated fiber and fiber exposed to the ambient second environment had a 0.28 nm bandwidth at −1 dB from the center wavelength. Whereas, Bragg gratings written in the fiber that was selectively hydrogenated at 300° C. and ~3000 psi had increased reflective bandwidths for all first (heated) to second (unheated) environment volume ratios tested. For example, Bragg gratings written in fibers that were selectively hydrogenated at 300° C. and ~3000 psi in devices having heated to unheated volume ratios of 1:20 and 2:1. The gratings written in the selectively hydrogenated fiber had reflective bandwidths of 1.1 nm and 2.2 nm, respectively at −1 dB. Similar results were achieved for selectively hydrogenation was performed for 15 and 30 minutes.

Depending upon the temperature and time conditions selected to perform the hydrogenation, it may be necessary to mark the section that is to be hydrogenated. This is not necessary in the prior art, because the entire fiber was hydrogenated to essentially the same concentration. An additional benefit of selectively hydrogenating is that at temperatures that affect the coating on the fiber, such as by turning it brown, the selectively hydrogenated section can be easily identified by temperature induced coating variations.

As indicated by the above results, selective hydrogenation can shorten the hydrogenation time by an order of magnitude or more compared with prior art processes. The increased throughput that can be achieved using the present invention can result in substantial savings in terms of facility and staffing requirements. Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. A method of introducing hydrogen into an optical waveguide, comprising:

introducing a first section of the optical waveguide into a first section of a container;

introducing a second section of the optical waveguide into a second section of the container;

creating a first environment in the first section of the container, wherein the first environment includes a first concentration of hydrogen, a first pressure, and a first temperature;

creating a second environment in the second section of the container, wherein the second environment includes a second concentration of hydrogen, a second pressure, and a second temperature, and wherein the second environment includes at least one of the second concentration of hydrogen being less than the first concentration of hydrogen, the second pressure being less than the first pressure, and the second temperature being less than the first temperature; and maintaining the first and second environments for a period of time sufficient such that a different amount of hydrogen gas is introduced into the first section than the second section.

2. The method of claim 1, wherein the first temperature is greater than 250° C. and the first pressure is greater than 200 atm.

3. The method of claim 1, wherein the first and second sections of the container form a single chamber, the first and second sections of the container each have a volume, and the volume of the first section of the container is at least approximately twice as large as the volume of the second section of the container.

4. The method of claim 3, wherein the volume of the first section of the container is approximately nine times as large as the volume of the second section of the container.

5. The method of claim 1, further comprising:
heating the first section of the container; and
cooling the second section of the container.

6. The method of claim 1, further comprising:
monitoring the first temperature of the first environment; and
heating the first environment in response to the monitored first temperature.

7. The method of claim 1, further comprising:
monitoring the second temperature of the second environment; and
cooling the second environment in response to the monitored second temperature.

8. The method of claim 1, further comprising:
monitoring the first temperature of the first environment;
heating the first environment in response to the monitored first temperature;
monitoring the second temperature of the second environment; and
cooling the second environment in response to the monitored second temperature.

9. The method of claim 1, further comprising:
monitoring an interface temperature of an interface region between the first and second sections of the container; and
performing at least one of heating and cooling of the interface region in response to the monitored interface temperature.

10. The method of claim 1, wherein the second section of the container includes at least one container wall, and further comprising placing the second section of the waveguide in thermal contact with the container wall of the second section of the container.

11. The method of claim 1, further comprising marking the first section of the waveguide.

12. The method of claim 11, wherein marking includes inducing a variation in color of the first section of the waveguide.

13. The method of claim 1, further comprising forming a temperature barrier between the first section and the second section.

14. The method of claim 1, further comprising forming a pressure barrier between the first section and the second section.

15. The method of claim 1, further comprising:
introducing an additional section of optical waveguide into an additional section of the container;
creating an additional environment in the additional section of the container, wherein the additional environment includes an additional temperature, an additional pressure, and an additional concentration of hydrogen, and wherein the additional environment includes at least one of: the additional temperature is less than the first temperature, the additional temperature is greater than the second temperature, the additional pressure is less than the first pressure, the additional pressure is greater than the second pressure, the additional concentration of hydrogen is less than the first concentration of hydrogen, and the additional concentration of hydrogen is greater than the second concentration of hydrogen.

16. The method of claim 15, further comprising
monitoring the first temperature of the first environment;
heating the first environment in response to the monitored first temperature;
monitoring the additional temperature of the additional environment; and
heating the additional environment in response to the monitored additional temperature.

17. The method of claim 16, further comprising:
monitoring an interface temperature of an interface region between the first section and the additional section of the container; and
performing at least one of heating and cooling of the interface region in response to the monitored interface temperature.

18. The method of claim 1, further comprising physically separating the first and second sections of the container.

19. The method of claim 18, wherein physically separating includes introducing a physical barrier between the first and second sections.

20. A method of introducing hydrogen into an optical waveguide, comprising:
introducing a first section of the optical waveguide into a first section of a container;
introducing a second section of the optical waveguide into a second section of the container, wherein the second section of the container includes a container wall;
placing the second section of the waveguide in thermal contact with the container wall of the second section of the container;
creating a first environment in the first section of the container, wherein the first environment includes a first concentration of hydrogen, a first pressure, and a first temperature;
creating a second environment in the second section of the container, wherein the second environment includes a second concentration of hydrogen, a second pressure, and a second temperature, and wherein the second environment includes at least one of the second concentration of hydrogen being less than the first concentration of hydrogen, the second pressure being less than the first pressure, and the second temperature being less than the first temperature;

monitoring the first temperature of the first environment;

heating the first environment in response to the monitored first temperature; and maintaining the first and second environments for a period of time sufficient such that a different amount of hydrogen gas is introduced into the first section than the second section.

21. The method of claim 20, further comprising:

monitoring the second temperature of the second environment; and cooling the second environment in response to the monitored second temperature.

22. The method of claim 20, wherein the first and second sections form a single chamber in the container, the first and second sections of the container each have a volume, and the volume of the first section of the container is at least approximately twice as large as the volume of the second section of the container.

23. The method of claim 22, wherein the volume of the first section of the container is approximately nine times as large as the volume of the second section of the container.

* * * * *